(12) United States Patent
Sonoda et al.

(10) Patent No.: US 7,444,047 B2
(45) Date of Patent: Oct. 28, 2008

(54) MULTIPLEXING OPTICAL SYSTEM

(75) Inventors: Shinichiro Sonoda, Kaisei-machi (JP); Hiromitsu Yamakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/639,308

(22) Filed: Dec. 15, 2006

(65) Prior Publication Data

US 2007/0237455 A1    Oct. 11, 2007

(30) Foreign Application Priority Data

Dec. 15, 2005    (JP)    ............................. 2005-361762

(51) Int. Cl.
G02B 6/32    (2006.01)

(52) U.S. Cl. ............................. 385/33; 385/11; 385/24; 385/31; 385/32; 385/34; 385/35; 385/38; 385/88; 385/89; 385/92; 385/93; 369/44.12; 369/44.14; 369/44.23; 369/44.24; 369/44.32; 369/112.17; 369/112.19; 369/112.23; 369/112.24; 369/112.27; 369/100; 369/103; 369/110.4; 369/116; 369/122; 398/50; 398/78; 398/79; 398/82; 398/88; 398/89

(58) Field of Classification Search ................... 385/11, 385/24, 31–35, 38, 88, 89, 92, 93; 398/50, 398/78, 79, 82, 88, 89; 369/44.12, 44.14, 369/44.23, 44.24, 44.32, 112.17, 112.19, 369/112.23, 112.24, 112.27, 100, 103, 110.4, 369/116, 122

See application file for complete search history.

(56) References Cited

U.S. PATENT DOCUMENTS 5,369,661 A * 11/1994 Yamaguchi et al. ........... 372/69
5,513,201 A * 4/1996 Yamaguchi et al. ........... 372/75
6,324,326 B1 * 11/2001 Dejneka et al. .............. 385/123
6,661,582 B1 * 12/2003 Rolt ............................. 359/668
6,754,007 B2 * 6/2004 Yamakawa et al. .......... 359/668
2004/0027631 A1 * 2/2004 Nagano et al. ............... 359/196
2004/0174604 A1 * 9/2004 Brown ......................... 359/618
2006/0018609 A1 * 1/2006 Sonoda et al. ................. 385/93

FOREIGN PATENT DOCUMENTS

| JP | 2002-48491 A | 2/2002 |
|---|---|---|
| JP | 2002-202442 A | 7/2002 |
| JP | 2003-158332 A | 5/2003 |
| JP | 2004-77779 A | 3/2004 |

* cited by examiner

*Primary Examiner*—Brian Healy
*Assistant Examiner*—Hung Lam
(74) *Attorney, Agent, or Firm*—Sughrue Mion, PLLC

(57) ABSTRACT

A multiplexing optical system includes collimator lenses, a first condensing lens, a second condensing lens and an optical fiber. The collimator lenses collimate divergent laser beams that have been emitted from semiconductor lasers. The first condensing lens condenses laser beams transmitted through the collimator lenses in only one of a plane including the stripe width direction of the semiconductor lasers and a plane including a direction perpendicular to the stripe width direction. The second condensing lens condenses laser beams transmitted through the first condensing lens. The optical fiber is arranged in such a manner that the condensed laser beams enter the optical fiber. In the multiplexing optical system, an anamorphic lens is used as the second condensing lens, and the anamorphic lens condenses the laser beams in the two planes in cooperation with the first condensing lens.

13 Claims, 7 Drawing Sheets

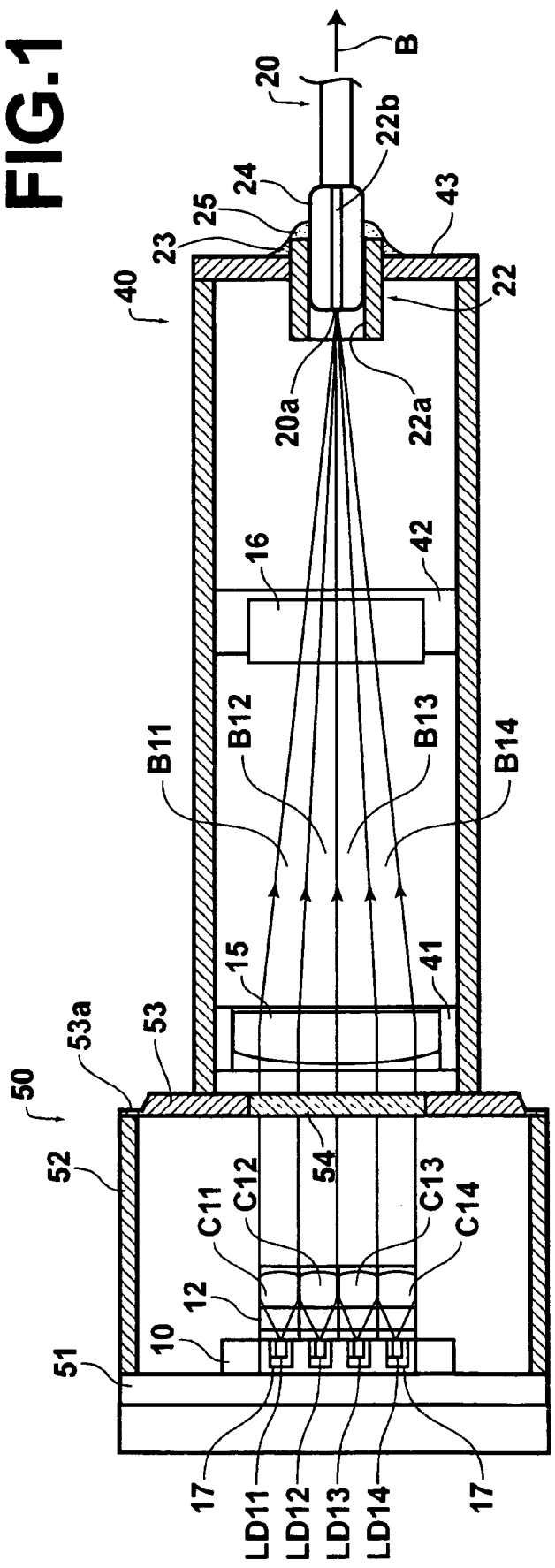

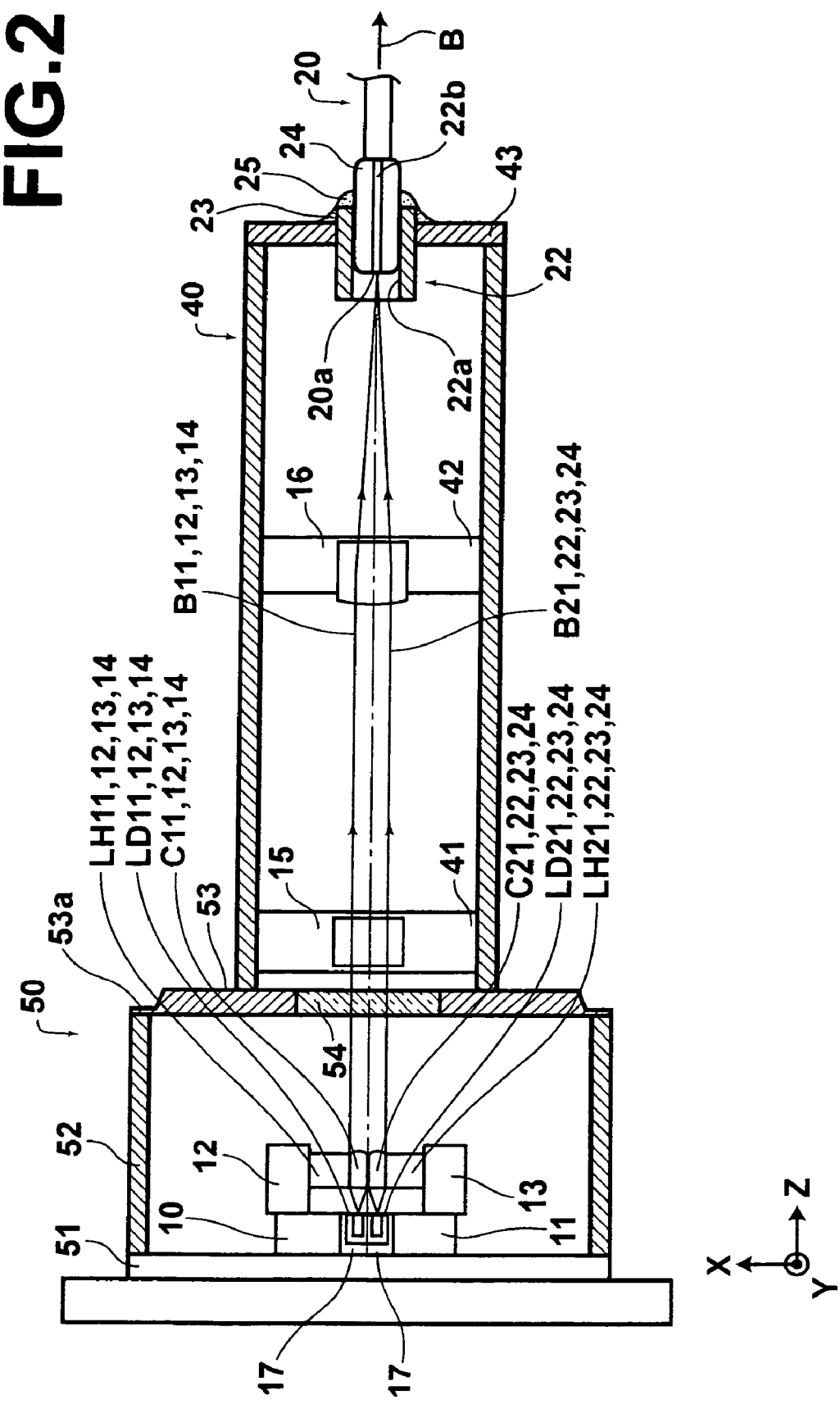

MULTIPLEXING OPTICAL SYSTEM

BACKGROUND OF THE INVENTION

1. Field of the Invention

The present invention relates to a multiplexing optical system. Specifically, the present invention relates to a multiplexing optical system for combining laser beams emitted from a plurality of semiconductor lasers into a single beam by making the laser beams enter an optical fiber.

2. Description of the Related Art

Conventionally, multiplexing optical systems are well known, for example, as disclosed in Japanese Unexamined Patent Publication No. 2002-202442 and Japanese Unexamined Patent Publication No. 2003-158332. In the multiplexing optical systems, laser beams emitted from a plurality of semiconductor lasers are condensed by a lens system, and the laser beams converge at a point. Then, the plurality of laser beams is combined into a single laser beam by making the laser beams enter an optical fiber placed in such a manner that the surface of an incident end of the optical fiber is positioned at the convergence position of the laser beams.

More specifically, in the conventional technique disclosed in Japanese Unexamined Patent Publication No. 2002-202442, a lens system including a plurality of collimator lenses and a condensing lens formed by a single axially symmetric lens is used as the lens system. The plurality of collimator lenses collimates divergent laser beams that have been emitted from the semiconductor lasers. The axially symmetric lens condenses the laser beams transmitted through the collimator lenses.

In Japanese Unexamined Patent Publication No. 2003-158332, a broad-area laser is used as a semiconductor laser to obtain a combined laser beam that has higher output power. The broad-area laser is a laser, of which the stripe width (light emission width) is wider. The lens system used in Japanese Unexamined Patent Publication No. 2003-158332 is basically similar to the lens system used in Japanese Unexamined Patent Publication No. 2002-202442. When the stripe width of the semiconductor laser is W and the magnification of the lens system is M, the size of condensed light on the surface of an incident end of an optical fiber is MW in a direction corresponding to the stripe width. If a semiconductor laser, such as a broad-area laser, that has a wider stripe width W is used, the size MW naturally becomes larger. In some cases, the size MW exceeds the core diameter of the optical fiber, and the input efficiency of the laser beam with respect to the optical fiber becomes lower.

To solve such problems, a technique for reducing the size MW of condensed light has been proposed, as disclosed in Japanese Unexamined Patent Publication No. 2004-077779. In this technique, a plurality of semiconductor lasers is arranged on concentric circles and placed as close to each other as possible. Accordingly, it becomes possible to adopt a lens system with a lower magnification M, thereby reducing the size MW of the condensed light.

Further, a lens system, as disclosed in Japanese Unexamined Patent Publication No. 2002-048491, is well known as a lens system for condensing a laser beam emitted from a semiconductor laser. In the lens system, a cylindrical lens with magnification Ms and a cylindrical lens with magnification Mf are combined so that the magnifications satisfy Ms<Mf. The cylindrical lens with magnification Ms is a lens that has power only within a plane including the stripe width direction of the semiconductor laser (hereinafter, this direction is referred to as a "slow axis direction" for convenience). The cylindrical lens with magnification Mf is a lens that has power only within a plane including a direction perpendicular to the stripe width direction (hereinafter, the direction perpendicular to the stripe width direction is referred to as a "fast axis direction" for convenience). Accordingly, it is possible to prevent the size of condensed light of the laser beam from increasing in one direction.

The structure disclosed in Japanese Unexamined Patent Publication No. 2004-077779 may achieve an expected result. However, there is a problem that mounting is very complicated.

Further, the lens system disclosed in Japanese Unexamined Patent Publication No. 2002-048491 may be adopted in the multiplexing optical systems disclosed in Japanese Unexamined Patent Publication No: 2002-202442 and Japanese Unexamined Patent Publication No. 2003-158332. However, in that case, the shape of the condensed light of the laser beam becomes a shape with a tail extending toward the outside of the optical axis of the lens system, and a light condensing characteristic deteriorates. Further, a problem that the input efficiency of the laser beam with respect to the optical fiber becomes lower is recognized.

FIGS. 9A and 9B are schematic diagrams illustrating the tail generation phenomenon. In FIGS. 9A and 9B, a case in which eight semiconductors (2×4=8) are arranged next to each other is used as an example. At light emission positions of the semiconductor lasers (LD), laser beams B11, B12, B13 and B14 and laser beams B21, B22, B23 and B24 are arranged as illustrated in FIG. 9A. However, after the laser beams are condensed by two cylindrical lenses, the state of condensed light on a plane onto which the condensed laser beams are projected (the surface of the incident end of the optical fiber) becomes as illustrated in FIG. 9B. Specifically, if a laser beam is emitted from a semiconductor laser that is positioned on the outer side of the optical axis of the optical system, the degree of tail generation becomes higher. Therefore, it is difficult to efficiently make such laser beams enter an optical fiber with a core diameter of approximately 50 μm.

SUMMARY OF THE INVENTION

In view of the foregoing circumstances, it is an object of the present invention to provide a multiplexing optical system for combining laser beams by making each of the laser beams emitted from a plurality of semiconductor lasers efficiently enter an optical fiber.

In a multiplexing optical system of the present invention, an optical system for condensing a plurality of collimated laser beams includes a first condensing lens and a second condensing lens. In the present invention, the input efficiency of the laser beams with respect to the optical fiber is improved by applying a cylindrical lens to the first condensing lens and by applying an anamorphic lens to the second condensing lens.

More specifically, the multiplexing optical system of the present invention is a multiplexing optical system comprising:

a plurality of collimator lenses;
a first condensing lens;
a second condensing lens; and
an optical fiber, wherein the plurality of collimator lenses collimates each of divergent laser beams that have been emitted from a plurality of semiconductor lasers, and wherein the first condensing lens is formed by a cylindrical lens for condensing laser beams transmitted through the collimator lenses in only one of a plane including a slow axis direction of the semiconductor lasers and a plane including a fast axis direction of the semiconductor lasers, and wherein the second condensing lens is formed by an anamorphic lens for condensing laser beams transmitted through the first condensing lens in the two planes in cooperation with the first condensing lens, and wherein the shapes of the anamorphic lens in the two planes are different from each other, and wherein the optical fiber is arranged in such a manner that the surface of an incident end of the optical fiber is positioned at a convergence position of the plurality of laser beams transmitted through the second condensing lens.

Here, the expression "the shapes in the two planes are different from each other" does not include a case in which the lens shape in one of the planes is a shape that has no power. Specifically, the second condensing lens must be an anamorphic lens, and a normal cylindrical lens is not adopted as the second condensing lens. Further, as described above, the shape of the second condensing lens is a shape that always has power in both of the two planes. However, it is not necessary that the shape of the second condensing lens is a general shape forming a part of an arc. For example, the shape of the second condensing lens may be a shape that does not have a curvature at a paraxial position but has a curvature only at a position closer to the periphery of the lens.

In the above structure, when a plurality of semiconductor lasers is arranged in a matrix form by arranging a plurality of semiconductors lasers in a direction parallel to the stripe width direction and by arranging a plurality of semiconductors lasers in a direction perpendicular to the stripe width direction, it is desirable that the number of the semiconductor lasers arranged next to each other in the direction perpendicular to the stripe width direction is larger than that of the semiconductor lasers arranged next to each other in the direction parallel to the stripe width direction.

In the above structure, it is desirable that an NA (numerical aperture) in the plane including the stripe width direction of the semiconductor lasers is less than an NA (numerical aperture) in the plane including a direction perpendicular to the stripe width direction.

In view of the fact that a tail is generated in the condensed laser beam in the optical system disclosed in Japanese Unexamined Patent Publication No. 2002-048491, the multiplexing optical system of the present invention has been invented. The optical system disclosed in Japanese Unexamined Patent Publication No. 2002-048491 is an optical system including the first condensing lens and the second condensing lens, both of which are formed by cylindrical lenses. In the multiplexing optical system of the present invention, an anamorphic lens that condenses a laser beam transmitted through the first condensing lens is applied to the second condensing lens. The anamorphic lens condenses the laser beam both in the plane including the slow axis direction of the semiconductor laser and in the plane including the fast axis direction of the semiconductor laser, and the shapes of the anamorphic lens in the two planes are different from each other. Since such an anamorphic lens is applied to the second condensing lens in the present invention, the tail generation can be reduced by appropriately setting the shapes of the two planes of the anamorphic lens. Hence, in the multiplexing optical system of the present invention, it is possible to combine the laser beams emitted from the plurality of semiconductor lasers by making each of the laser beams enter an optical fiber at high input efficiency.

BRIEF DESCRIPTION OF THE DRAWINGS

FIG. 1 is a partially cut-away plane view of a laser module including a multiplexing optical system according to a first embodiment of the present invention;

FIG. 2 is a partially cut-away side view of the laser module;

DESCRIPTION OF THE PREFERRED EMBODIMENTS

Figure 3A:
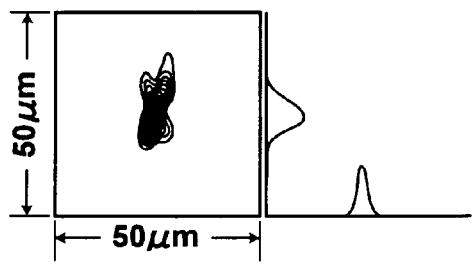
FIG. 3A is a graph showing intensity distribution at a convergence position of a laser beam close to an optical axis in the multiplexing optical system of the present invention, the intensity distribution being obtained by calculation.

Hereinafter, embodiments of the present invention will be described in detail with reference to the attached drawings.

FIG. 1 is a partially cut-away plane view of a laser module including a multiplexing optical system according to a first embodiment of the present invention. FIG. 2 is a partially cut-away side view of the laser module according to the first embodiment of the present invention. As illustrated in FIGS. 1 and 2, the laser module of the present embodiment includes semiconductor laser devices arranged next to each other in the vertical direction of FIG. 1. For example, the semiconductor laser devices are four chip-type semiconductor laser devices LD11, LD12, LD13 and LD14, which are arranged next to each other in the vertical direction of FIG. 1, and four chip-type semiconductor laser devices LD21, LD22, LD23 and LD24, which are arranged next to each other in a manner similar to the arrangement of the chip-type semiconductor laser devices LD11 through LD14 (eight semiconductor laser devices in total). The laser module of the present embodiment also includes an LD block 10 made of Cu and an LD block 11 made of Cu. The semiconductor laser devices LD11 through LD14 are fixed onto the inside surface (a surface close to the semiconductor laser devices) of the LD block 10 with a soldering material. The semiconductor laser devices LD21 through LD24 are fixed onto the inside surface (a surface close to the semiconductor laser devices) of the LD block 11 with a soldering material in a similar manner.

The eight semiconductor laser devices LD11 through LD14 and LD21 through LD24 arranged in a matrix form, as described above, are placed so that the stripe width directions of all of the semiconductor laser devices are positioned in the vertical direction in FIG. 2. For that purpose, the semiconductor laser devices are arranged so that the stripe width directions of the semiconductor laser devices are arranged parallel to each other.

Further, the laser module includes four collimator lenses C11, C12, C13 and C14. The collimator lenses C11, C12, C13 and C14 collimate laser beams B11, B12, B13 and B14, respectively. Each of the laser beams B11, B12, B13 and B14 is a laser beam that has been emitted in a divergent state. The laser beams B11, B12, B13 and B14 are beams that have been emitted from the semiconductor laser devices LD11, LD12, LD13 and LD14, respectively. The laser module also includes lens holders LH11, LH12, LH13 and LH14. The lens holders LH11, LH12, LH13 and LH14 hold the collimator lenses C11, C12, C13 and C14, respectively. Further, the laser module includes a heat block (heat-radiation block) 12 made of Cu. The heat block 12 holds the lens holders LH11 through LH14, and the heat block 12 is fixed onto the LD block 10. Further, the laser module includes four collimator lenses C21, C22, C23 and C24. The collimator lenses C21, C22, C23 and C24 collimate laser beams B21, B22, B23 and B24, respectively. Each of the laser beams B21, B22, B23 and B24 is a laser beam that has been emitted in a divergent state. The laser beams B21, B22, B23 and B24 are beams that have been emitted from the semiconductor laser devices LD21, LD22, LD23 and LD24, respectively. The laser module also includes lens holders LH21, LH22, LH23 and LH24. The lens holders LH21, LH22, LH23 and LH24 hold the collimator lenses C21, C22, C23 and C24, respectively. Further, the laser module includes a heat block (heat-radiation block) 13 made of Cu. The heat block 13 holds the lens holders LH21 through LH24, and the heat block 13 is fixed onto the LD block 11. The LD blocks 10 and 11 are fixed onto a package base plate 51, which forms a first package 50.

Each of the collimator lenses C1 through C14 is a truncated lens with an effective height of 2.0 mm, an effective width of 3.6 mm and a focal length of 3 mm, for example. The collimator lenses C11 through C14 are arranged next to each other so as to be apart from each other by 0.15 mm and fixed. Other collimator lenses C21 through C24 are similar to the collimator lenses C1 through C14.

Further, a surface of the heat block 12 that holds the lens holders LH11 through L14 is a surface on which highly accurate and highly flat processing has been carried out, and the flatness of the surface is less than or equal to 0.3 µm. In the structure, in which the collimator lenses C1 through C14 are fixed to the heat block 12 through the lens holders LH11 through LH14, the positions of the collimator lenses C1 through C14 with respect to y direction and z direction (please refer to FIG. 2) can be adjusted by adjusting the positions of the lens holders LH11 through LH14 during a fixing operation. Further, in the structure, in which the heat block 12 is fixed onto the LD block 10, the positions of the collimator lenses C1 through C14 with respect to x direction and y direction (please refer to FIG. 2) can be adjusted by adjusting the position of the heat block 12 during a fixing operation. In the present embodiment, lens fixing accuracy is ±0.5 µm with respect to x direction and y direction, and lens fixing accuracy is 1 µm with respect to z direction. These features are also achieved in a similar manner on the heat block 13 side.

The first package 50 is formed by the package base plate 51, a side wall 52 and a lid plate 53, and the first package 50 is hermetically sealed. The side wall 52 is fixed onto the package base plate 51, and the side wall 52 surrounds four sides of the package base plate 51. The lid plate 53 abuts the side wall 52 and the lid plate 53 is fixed to the side wall 52. The semiconductor laser devices LD11 through LD14 and LD21 through LD24, collimator lenses C11 through C14 and C21 through C24 and other elements, such as the holders, are housed in the first package 50. Further, a transparent plate 54, such as optical glass, is fitted into the lid plate 53. Laser beams B11 through B14 and B21 through B24 are emitted to the outside of the first package 50 through the transparent plate 54.

Further, the laser module includes a cylindrical lens 15, an anamorphic lens 16 and an optical fiber 20. The cylindrical lens 15 condenses laser beams B11 through B14 and B21 through B24 that have been collimated and emitted through the transparent plate 54 only in a plane observed (illustrated) in FIG. 1 (a plane including a direction perpendicular to the stripe width direction of the semiconductor laser devices LD11 through LD14 and LD21 through LD24, namely the fast axis direction). The anamorphic lens 16 condenses laser beams B11 through B14 and B21 through B24 that have been transmitted through the cylindrical lens 15 in the plane observed (illustrated) in FIG. 2 (a plane including the stripe width direction of the semiconductor laser devices LD11 through LD14 and LD21 through LD24, namely the slow axis direction). The anamorphic lens 16 also condenses the laser beams B11 through B14 and B21 through B24 in the plane including the fast axis direction in cooperation with the cylindrical lens 15. Further, the optical fiber 20 is arranged in such a manner that an end (the surface of an incident end) 20a of the optical fiber 20 is positioned at a convergence position of the laser beams B1 through B14 and B21 through B24, condensed by the cylindrical lens 15 and the anamorphic lens 16.

The lens holders 41 and 42 are fixed to the inside of a hermetically sealed second package 40. The cylindrical lens 15 and the anamorphic lens 16 are fixed to the lens holders 41 and 42, respectively, and housed in the second package 40. A ferrule holding part 22 having a cylindrical ferrule holding hole 22a is fixed to a front plate 43 of the package 40, for example, with a flux-free solder 23. A resin coating in the vicinity of the surface 20a of the incident end of the optical fiber 20 is removed, and a fiber element wire 20b is exposed. The exposed fiber element wire 20b is threaded through a narrow hole at the center of a cylindrical ferrule 24. Further, the ferrule 24 is fixed to the ferrule holding part 22 with a flux-free solder 25. Accordingly, the optical fiber 20 is connected to the second package 40.

As the semiconductor laser devices LD11 through LD14 and LD21 through LD24, GaN-based semiconductor laser devices are used. The oscillation wavelength of the semiconductor laser devices is within a range of approximately 350 nm to 500 nm. Each of the semiconductor laser devices LD11 through LD14 is mounted on the LD block 10 through a submount 17, and each of the semiconductor laser devices LD21 through LD24 is mounted on the LD block 11 through a submount 17. An actual example of the semiconductor laser device is an InGaN-based semiconductor laser device disclosed in Japanese Unexamined Patent Publication No. 2004-134555 or the like, for example. As the submount 17, a submount made of a steel-diamond composite material with a thermal conductivity coefficient of 600 W/mK, and of which the size is 1×1×0.25 mm, is used, for example. Since such a submount 17 is used, heat is easily diffused from an active layer of each of the semiconductor laser devices LD11 through LD14 and LD21 through LD24, which have high heat densities. Accordingly, a rise in temperature during drive of the devices is suppressed, and the reliability of the devices is improved. As a method for mounting the submount 17, a method for directly fixing the submount 17 to each of the LD blocks 10 and 11 with a solder or the like may be adopted, for example. Alternatively, the submount 17 may be mounted on a plurality of parts.

The semiconductor laser devices LD11 through LD14 and LD21 through LD24, which are arranged in a matrix form as described above, are connected to a wire drawn from the package (not illustrated). The semiconductor laser devices are connected the wire by bonding through an electrode pad. The wire is drawn from the inside of the first package 50 to the outside of the first package 50 while the inside and the outside of the first package 50 are hermetically separated.

In the present embodiment, the cylindrical lens 15 and the anamorphic lens 16 form the first condensing lens and the second condensing lens, respectively. The first condensing lens and the second condensing lens make collimated laser beams B11 through B14 and B21 through B24 converge on the surface 20a of the incident end of the optical fiber 20. Accordingly, the shape of a cross section of each of converged laser beams B11 through B14 and B21 through B24 becomes close to a true circle.

In the laser module, each of the divergent laser beams B11 through B14 and B21 through B24, which have been emitted from the semiconductor laser devices LD11 through LD14 and LD21 through LD24, are collimated by the collimator lenses C11 through C14 and C21 through C24, respectively. The collimated beams are transmitted through the transparent plate 54 and emitted to the outside of the first package 50. Next, the collimated laser beams B11 through B14 and B21 through B24 are condensed by the cylindrical lens 15 and the anamorphic lens 16. The condensed beams converge on the surface 20a of the incident end of the optical fiber 20 (more specifically, on the surface of the end of the core of the optical fiber 20). Accordingly, the laser beams B11 through B14 and B21 through B24 enter the optical fiber 20 and propagate therethrough. Thus, the laser beams are combined into a high-intensity laser beam B and the high-intensity laser beam B is emitted from the optical fiber 20.

Next, the collimator lenses C11 through C14 and C21 through C24, the cylindrical lens 15 and the anamorphic lens 16, which form the multiplexing optical system of the present embodiment together with the optical fiber 20, will be described in detail.

In the aforementioned related technique, a tail is generated in a laser beam that has been condensed by two cylindrical lenses, each having power in a direction perpendicular to each other. The tail is generated because a laser beam that enters the second cylindrical lens, which is the second condensing lens, is not parallel light and the laser beam diagonally enters the second cylindrical lens. Therefore, in the present invention, the anamorphic lens 16 as described above is used as the second condensing lens to correct aberration of the laser beam due to diagonal incidence of the laser beam, thereby reducing the tail generation.

Figure 3B:
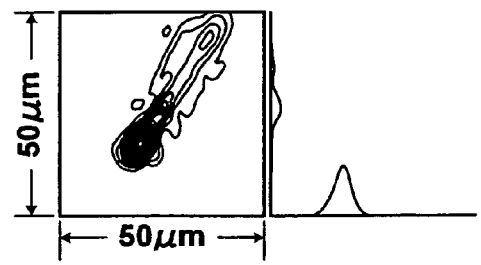
FIG. 3B is a graph showing intensity distribution at a convergence position of a laser beam far from the optical axis in the multiplexing optical system of the present invention, the intensity distribution being obtained by calculation.

Basically, if the aforementioned structure of the present invention is adopted, tail generation in a laser beam can be reduced by appropriately setting the shapes of the two planes of the anamorphic lens 16. However, in some cases, a tail may be still generated in a beam that is far from the optical axis of the optical system. FIGS. 3A and 3B illustrate intensity distribution at convergence positions of such laser beams obtained by calculation. FIG. 3A shows the result of calculation concerning one of laser beams (laser beams B12, B13, B22 and B23 in the aforementioned example) close to the optical axis of the optical system. FIG. 3B shows the result of calculation concerning one of laser beams (laser beams B11, B14, B21 and B24 in the aforementioned example) far from the optical axis of the optical system. As illustrated in FIG. 3A, tail generation in the laser beam close to the optical axis is substantially prevented. However, as illustrated in FIG. 3B, a tail is still generated in the laser beam far from the optical axis. Therefore, it is recognized that when the laser beam enters an optical fiber with a core diameter of approximately 50 µm, the laser beam is substantially lost.

Figure 4A:
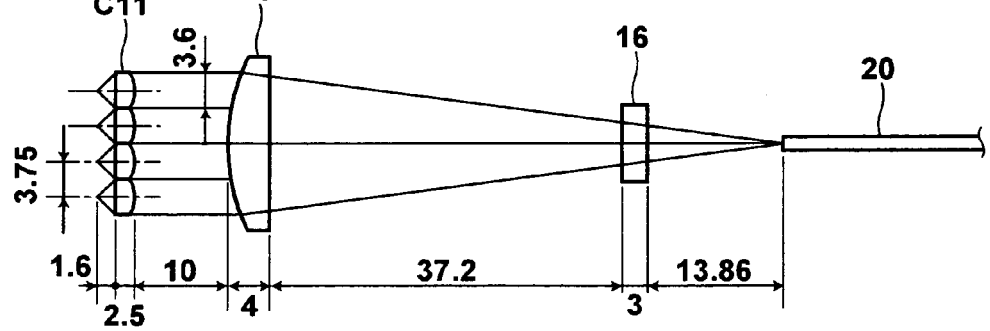
FIG. 4A is a plane view showing the sizes of major elements in the optical system illustrated in FIG. 1.
Figure 4B:
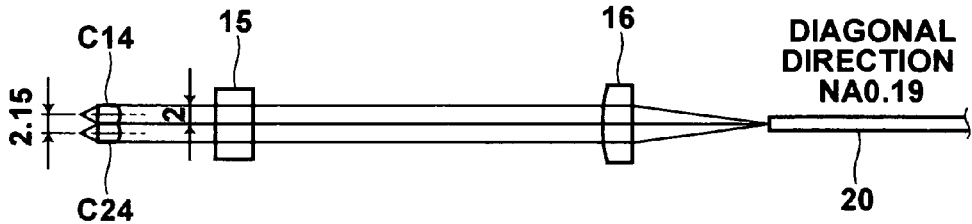
FIG. 4B is a side view showing the sizes of major elements in the optical system illustrated in FIG. 1.

In the multiplexing optical system of the present embodiment, the aforementioned points are considered and the input efficiency is further improved. We have found out that a tail is still generated in a laser beam far from the optical axis, as described above, because the focal length of a cylindrical lens in a plane including the fast axis and that of an anamorphic lens in a plane including the slow axis are close to each other. Therefore, the difference in the focal length should be increased. Hence, in the present embodiment, a structure in which the difference in the focal length is increased is adopted, as illustrated in FIGS. 4A and 4B. In FIGS. 4A and 4B; numerical values are added to the major elements illustrated in FIGS. 1 and 2.

Specifically, in the present embodiment, in the plane (a plane including the fast axis direction) illustrated in FIG. 1, the collimator lenses C11 through C24 have NA=0.6 and focal length=3 mm. Further, in the plane (a plane including the fast axis direction) illustrated in FIG. 1, the cylindrical lens 15 has NA=0.134 and focal length=55.3 mm, and the anamorphic lens 16 has focal length=∞. In this plane, the anamorphic lens 16 substantially has no power. However, since the anamorphic lens 16 is not a cylindrical lens, the anamorphic lens 16 still has some power. The shape of such an anamorphic lens 16 will be described later in detail.

Meanwhile, in the plane (a plane including the slow axis direction) illustrated in FIG. 2, the collimator lenses C11 through C24 have NA=0.333 and focal length=3 mm, and the anamorphic lens 16 has NA=0.134 and focal length=15.5 mm. The optical fiber 20 has NA=0.19.

Figure 10:
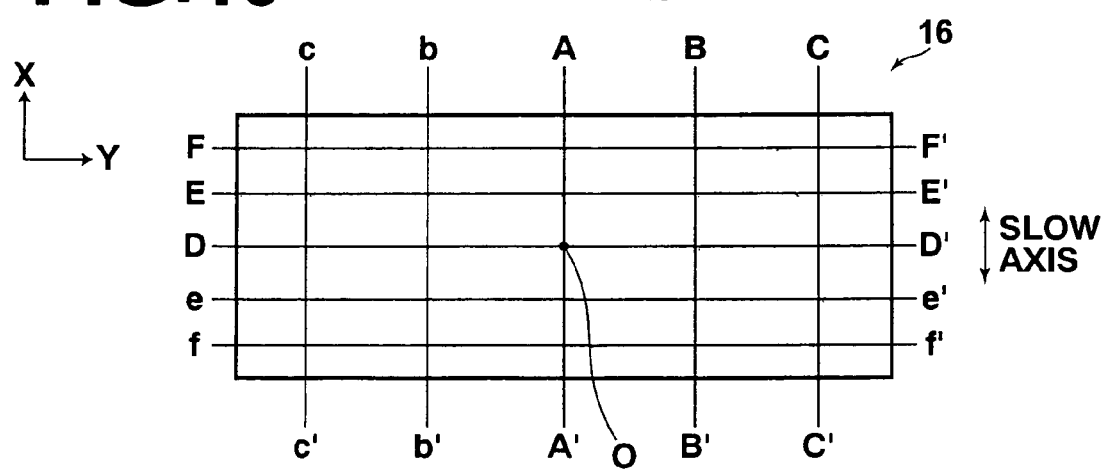
FIG. 10 is a front view illustrating a part of the optical system illustrated in FIG. 1.

The shape of the anamorphic lens 16 will be described in detail. FIG. 10 illustrates a view of the anamorphic lens 16 observed from the direction of the optical axis. As illustrated in FIG. 10, positions on the lens surface of the anamorphic lens 16 in this plane are defined by X and Y coordinates with respect to the optical axis O as the origin. Specifically, X direction is a direction parallel to the slow axis, and Y direction is a direction parallel to the fast axis. Further, position Z in the direction of the optical axis at position (X,Y) on the lens surface is defined by the following equation 1 when the position of the optical axis O on the lens surface is the origin. Here, the value of each of the coefficients in equation 1 is shown in Table 1. Further, the positions in X, Y and Z directions are represented in the unit of mm. With respect to Z direction, the right direction in FIGS. 1 and 2 is +(plus) and the left direction in FIGS. 1 and 2 is − (minus).

The shape of the lens surface of the anamorphic lens 16 defined by the following equation 1 will be schematically described. The shapes of cross sections that are perpendicular to the paper surface of FIG. 10 and parallel to the slow axis are different from each other at all the positions in the fast axis direction. All the positions in the fast axis direction are positions at which the distances from the optical axis O are different from each other. Meanwhile, the shapes of cross sections that are perpendicular to the paper surface of FIG. 10 and parallel to the fast axis are shapes with paraxial curvature of 0 (zero), and the lens has power for correcting aberration at positions closer to the periphery of the lens. Further, the shapes of the cross sections are different from each other at all the positions in the slow axis direction.

All the positions in the slow axis direction are positions at which the distances from the optical axis O are different from each other.

$$Z = (CX \cdot X^2 + CY \cdot Y^2)/ \qquad \text{[Equation 1]}$$
$$[1 + \{1 - (KX \cdot (CX \cdot X)^2 + KY \cdot (CY \cdot Y)^2)\}^{1/2}] +$$
$$A4\{(1 - K2)X^2 + (1 + K2)Y^2\}^2 +$$
$$A6\{(1 - K3)X^2 + (1 + K3)Y^2\}^3 +$$
$$A8\{(1 - K4)X^2 + (1 + K4)Y^2\}^4 +$$
$$A10\{(1 - K5)X^2 + (1 + K5)Y^2\}^5$$

TABLE 1

| | |
|---|---|
| CX | $1.0836 \times 10^{-1}$ |
| CY | 0.0 |
| KX | −1.9194 |
| KY | $-2.5385 \times 10^{-2}$ |
| A4 | $4.8611 \times 10^{-5}$ |
| K2 | −1.6525 |
| A6 | $-2.8836 \times 10^{-6}$ |
| K3 | $1.6967 \times 10^{-1}$ |
| A8 | $-4.8546 \times 10^{-12}$ |
| K4 | $-1.4126 \times 10$ |
| A10 | $-8.3688 \times 10^{-18}$ |
| K5 | $-4.4417 \times 10^{-1}$ |

Figure 11A:
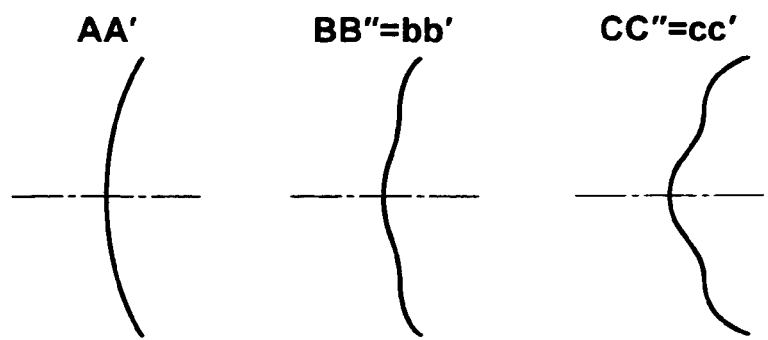
FIG. 11A is a schematic diagram for explaining the shape of a second condensing lens in the optical system illustrated in FIG. 1.
Figure 11B:
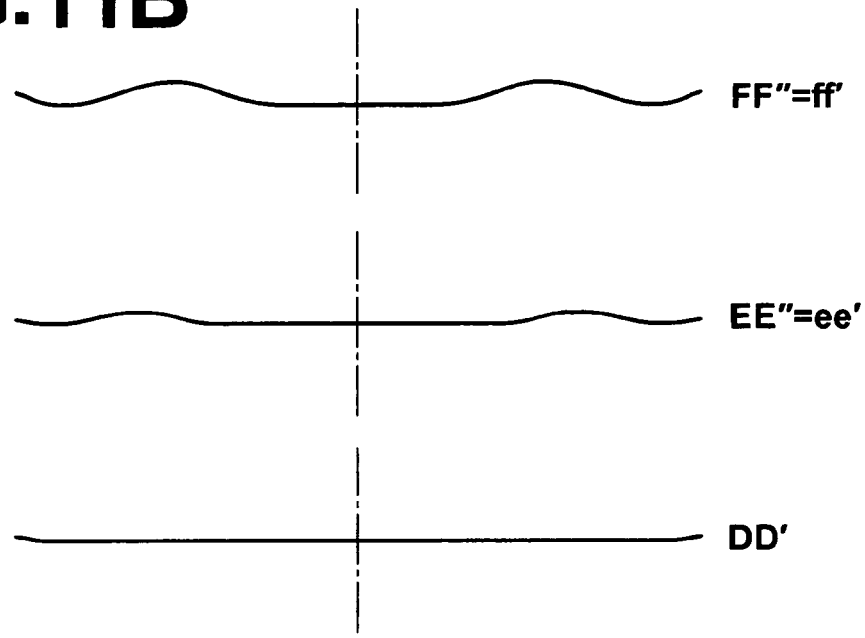
FIG. 11B is a schematic diagram for explaining the shape of the second condensing lens in the optical system illustrated in FIG. 1.

FIGS. 11A and 11B are diagrams schematically illustrating actual shapes of the lens surface of the anamorphic lens 16. In FIGS. 11A and 11B, the curvature is exaggerated. In FIG. 11A, the shapes of cross sections perpendicular to the paper surface of FIG. 10 are illustrated. In FIG. 11A, a cross section along line AA', a cross section along line BB' and a cross section along line CC' are illustrated. In FIG. 11B, the shapes of cross sections perpendicular to the paper surface of FIG. 10 are illustrated. In FIG. 11B, a cross section along line DD', a cross section along line EE' and a cross section along line FF' are illustrated. The shape of the lens surface is symmetrical both in the vertical direction of FIG. 10 and in the horizontal direction of FIG. 10. Therefore, the shape of a cross section along line bb', of which the distance from the optical axis O is the same as that of line BB' from the optical axis O, is the same as the shape of the cross section along line BB'. Further, the shape of a cross section along line cc' is the same as that of a cross section along line CC' in a similar manner. Further, the shape of a cross section along line ee' is the same as that of a cross section along line EE' in a similar manner. The shape of a cross section along line ff' is the same as that of a cross section along line FF' in a similar manner.

Figure 5A:
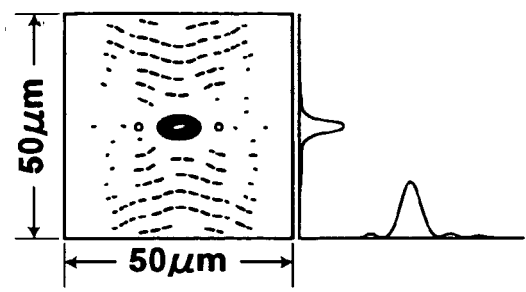
FIG. 5A is a graph showing intensity distribution at a convergence position of a laser beam close to an optical axis in the multiplexing optical system illustrated in FIG. 1, the intensity distribution being obtained by calculation.
Figure 5B:
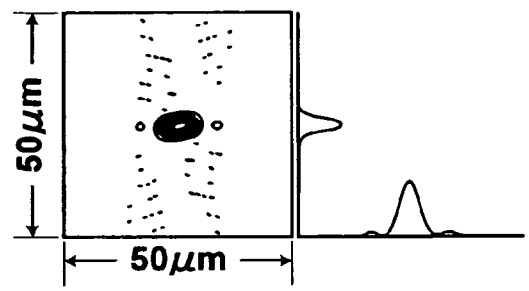
FIG. 5B is a graph showing intensity distribution at a convergence position of a laser beam far from the optical axis in the multiplexing optical system illustrated in FIG. 1, the intensity distribution being obtained by calculation.

With respect to this structure, FIGS. 5A and 5B illustrate intensity distribution at a convergence position of a laser beam obtained by calculation. FIG. 5A shows the result of calculation concerning a laser beam B12, which is one of laser beams close to the optical axis of the optical system. FIG. 5B shows the result of calculation concerning a laser beam B11, which is one of laser beams far from the optical axis of the optical system. As illustrated in FIGS. 5A and 5B, it is recognized that tail generation in the laser beam B11 far from the optical axis as well as tail generation in the laser beam B12 close to the optical axis is prevented.

In the first embodiment, as described above, the focal length of the cylindrical lens 15 and that of the anamorphic lens 16 are selected so that a required NA (numerical aperture) in the vertical direction on the surface of the incident end of the optical fiber 20 becomes the same as a required NA in the horizontal direction on the surface of the incident end of the optical fiber 20. A light condensing characteristic is efficient as described above. However, the magnification in the fast axis direction is approximately 18 times (×18). If the value of the magnification is large, the condensed point of each of the laser beams B11 through B24 tends to be shifted from the position of the optical fiber 20. When optical axis adjustment of the optical system and the semiconductor lasers is performed, or when the optical system and the semiconductor lasers are fixed by bonding or the like, if the semiconductor laser devices LD11 through LD24 and the collimator lenses C11 through C24 are relatively shifted, for example, by 1 μm due to a change in ambient temperature or the like, the condensed point of the laser beams B11 through B24 and the optical fiber 20 are shifted from each other by as much as approximately 18 μm on the surface of the incident end of the optical fiber 20.

A method for reducing the magnification of the optical system to suppress such shift in position will be described. When the shift in position should be suppressed, the focal length of the cylindrical lens 15 and that of the anamorphic lens 16 are adjusted so that beams are condensed in such a manner that an NA in the slow axis direction and an NA in the fast axis direction are different from each other. Accordingly, the focal length of the cylindrical lens 15 becomes shorter. In view of the above, examples of specification of the optical system are shown in Table 2. In Table 2, an NA in the slow axis direction and an NA in the fast axis direction are changed in various manners.

TABLE 2

| θ | NA: slow | NA: fast | slow width | fast width | Slow f | fast f | slow M. | Fast N. | slow B. |
|---|---|---|---|---|---|---|---|---|---|
| 10.00 | 0.033 | 0.187 | 2.79 | 14.85 | 42.28 | 39.68 | 14.09 | 13.23 | 98.66 |
| 20.00 | 0.065 | 0.179 | 2.79 | 14.85 | 21.47 | 41.59 | 7.16 | 13.86 | 50.09 |
| 30.00 | 0.095 | 0.165 | 2.79 | 14.85 | 14.68 | 45.12 | 4.89 | 15.04 | 34.26 |

TABLE 2-continued

| θ | NA: slow | NA: fast | slow width | fast width | Slow f | fast f | slow M. | Fast N. | slow B. |
|---|---|---|---|---|---|---|---|---|---|
| 40.00 | 0.122 | 0.146 | 2.79 | 14.85 | 11.42 | 51.01 | 3.81 | 17.00 | 26.65 |
| 45.00 | 0.134 | 0.134 | 2.79 | 14.85 | 10.38 | 55.27 | 3.46 | 18.42 | 24.23 |
| 50.00 | 0.146 | 0.122 | 2.79 | 14.85 | 9.58 | 60.80 | 3.19 | 20.27 | 22.36 |
| 60.00 | 0.165 | 0.095 | 2.79 | 14.85 | 8.48 | 78.16 | 2.83 | 26.05 | 19.78 |
| 70.00 | 0.179 | 0.065 | 2.79 | 14.85 | 7.81 | 114.26 | 2.60 | 38.09 | 18.23 |
| 80.00 | 0.187 | 0.033 | 2.79 | 14.85 | 7.46 | 225.05 | 2.49 | 75.02 | 17.40 |

(In Table 2, slow M. represents slow magnification, fast M. represents fast magnification, and slow B. represents a slow beam diameter.)

Figure 6:
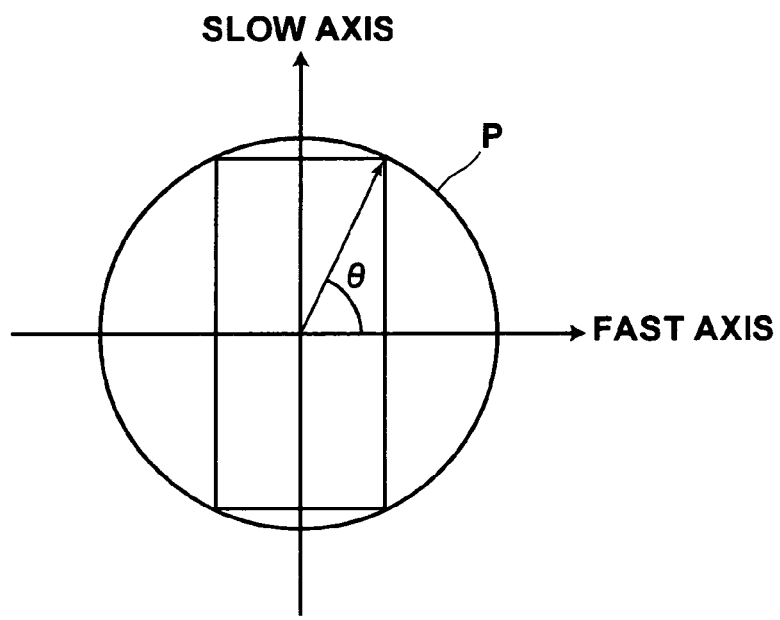
FIG. 6 is a schematic diagram illustrating the shape of condensed light of a laser beam in the multiplexing optical system illustrated in FIG. 1.

In Table 2, "θ" is an angle (°) formed by the diagonal line of a condensed point P, which substantially forms a rectangle on the surface of the incident end of the optical fiber as illustrated in FIG. 6, with respect to the fast axis. In Table 2, "NA: slow" is an NA in the slow axis direction, and "NA: fast" is an NA in the fast axis direction. In Table 2, "slow width" is a beam width (mm) of all the laser beams B11 through B24 in the slow axis direction before the beams enter the cylindrical lens 15. In Table 2, "fast width" is a beam width (mm) of all the laser beams B11 through B24 in the fast axis direction before the beams enter the cylindrical lens 15. In Table 2, "slow f" is focal length (mm) in the plane including the slow axis, and "fast f" is focal length (mm) in the plane including the fast axis. In Table 2, "slow magnification" is the magnification of the optical system in the slow axis direction, and "fast magnification" is the magnification of the optical system in the fast axis direction. Further, "slow beam diameter" is a beam diameter (μm) in the slow axis direction.

In the first embodiment, θ=45° and NA: slow=NA: fast=0.134. In contrast, if the value of θ is less than 45° and an NA in the slow axis direction is less than an NA in the fast axis direction, the focal length in the plane including the fast axis becomes shorter. Therefore, it is possible to reduce the magnification in the fast axis direction. In that case, the magnification in the slow axis direction increases. For example, if θ=30°, the magnification in the slow axis direction is 4.89. If the stripe width (light emission width) of a semiconductor laser in this direction is 7 μm, the beam diameter on the surface of an incident end of the optical fiber 20 is 34.26 μm.

Figure 7A:
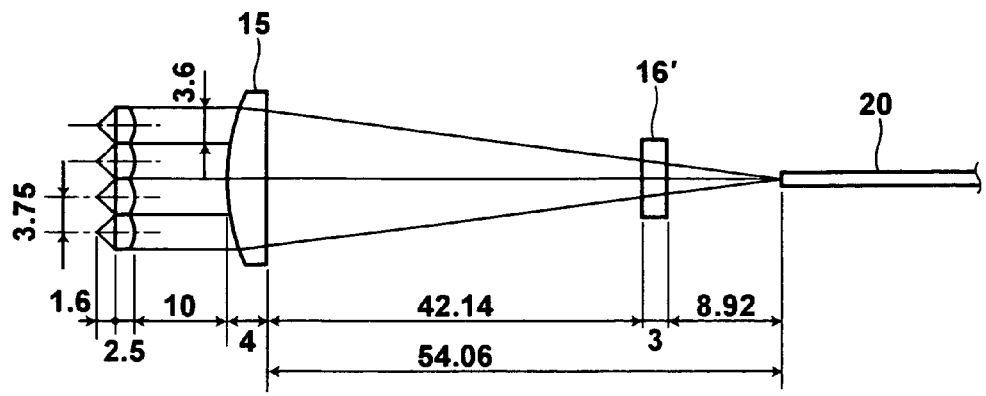
FIG. 7A is a plane view showing the sizes of major elements in a multiplexing optical system in a second embodiment of the present invention.
Figure 7B:
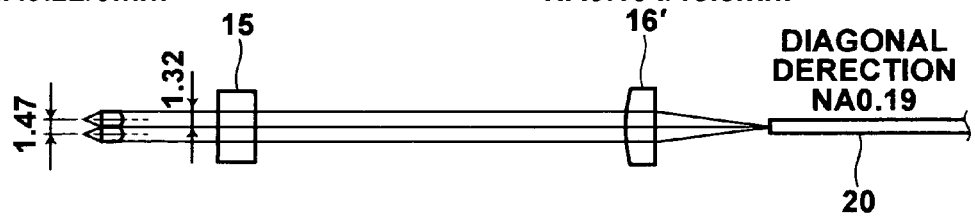
FIG. 7B is a side view showing the sizes of major elements in the multiplexing optical system in the second embodiment of the present invention.

Therefore, when the laser beams B11 through B24 are combined by making the laser beams enter the optical fiber 20 with a core diameter of approximately 50 to 60 μm, the optimum value of θ is approximately θ=30°. At this time, the magnification in the fast axis direction is 15 times (×15) and it is less than the magnification (×18) adopted in the case of θ=45°. FIGS. 7A and 7B are diagrams illustrating the specification of major elements of the multiplexing optical system in the second embodiment of the present invention. In the second embodiment, θ=30°. FIG. 7A is a diagram illustrating a shape in the plane including the fast axis, and FIG. 7B is a diagram illustrating a shape in the plane including the slow axis. In this case, the collimator lenses C11 through C14 are also arranged next to each other so as to be apart from each other by 0.15 mm and fixed. Other collimator lenses C21 through C24 are arranged and fixed in a similar manner.

Further, the shape of an anamorphic lens 16', which is adopted in the second embodiment, is also defined by equation 1, and the values of the coefficients are as shown in Table 3.

TABLE 3

| CX | $1.5534 \times 10^{-1}$ |
|---|---|
| CY | 0.0 |
| KX | −1.5509 |
| KY | 0.0 |
| A4 | $1.0066 \times 10^{-4}$ |
| K2 | −1.8582 |
| A6 | $-2.8336 \times^{-6}$ |
| K3 | $-6.5767 \times 10^{-1}$ |
| A8 | $-4.5650 \times 10^{-12}$ |
| K4 | $-1.3290 \times 10$ |
| A10 | $-8.3687 \times 10^{-18}$ |
| K5 | $-4.3219 \times 10^{-1}$ |

Figure 8A:
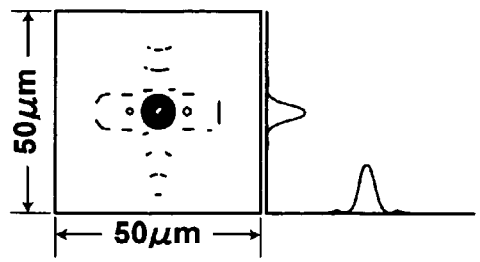
FIG. 8A is a graph showing intensity distribution at a convergence position of a laser beam close to an optical axis in the multiplexing optical system in the second embodiment of the present invention, the intensity distribution being obtained by calculation.
Figure 8B:
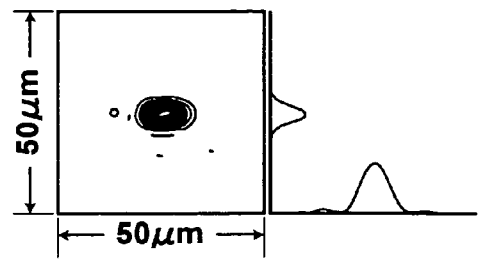
FIG. 8B is a graph showing intensity distribution at a convergence position of a laser beam far from the optical axis in the multiplexing optical system in the second embodiment of the present invention, the intensity distribution being obtained by calculation.
Figure 9A:
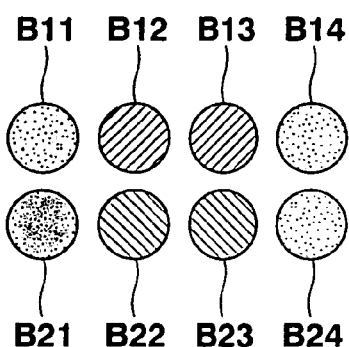
FIG. 9A is a schematic diagram illustrating a condensed state of a laser beam in a multiplexing optical system according to the related art.
Figure 9B:
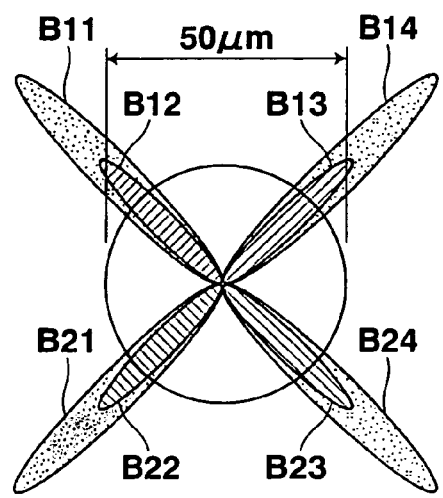
FIG. 9B is a schematic diagram illustrating a condensed state of a laser beam in a multiplexing optical system according to the related art.

With respect to the second embodiment 2, FIGS. 8A and 8B are diagrams illustrating intensity distribution at a convergence position of laser beams B11 through B24 obtained by calculation. FIG. 8A shows the result of calculation concerning a laser beam B12, which is one of laser beams close to the optical axis of the optical system. FIG. 8B shows the result of calculation concerning a laser beam B11, which is one of laser beams far from the optical axis of the optical system. As illustrated in FIGS. 8A and 8B, in this example, a difference in focal length between the cylindrical lens 15 and the anamorphic lens 16' is less than a difference in focal length that is present in the case of θ=45°. Therefore, in the second embodiment, although the light condensing characteristic slightly deteriorates from the light condensing characteristic that is achieved in the case of θ=45°, illustrated in FIGS. 5A and 5B, large tails are not generated in the laser beams B12 and B11.

A laser module that has basic structure similar to that of the laser module illustrated in FIGS. 1 and 2 is produced using the multiplexing optical system in the second embodiment of the present invention. In that case, as the semiconductor laser devices LD11 through LD14 and LD21 through LD24, eight semiconductor laser devices with stripe width of 10 μm and oscillation wavelength of 405 nm are used. Meanwhile, the core diameter of the optical fiber is 60 μm and an NA is 0.22.

Five laser modules, as described above, are produced, and each of them is named No. 1 through No. 5. Table 4 shows the result of examination of input efficiency (%) of laser beams entering the optical fiber 20 in laser modules No. 1 through No. 5.

TABLE 4

| Module | 1 | 2 | 3 | 4 | 5 | 6 | 7 | 8 | Σ | ALL |
|---|---|---|---|---|---|---|---|---|---|---|
| No. 1 | 69.5 | 62.5 | 69.5 | 67.5 | 71.0 | 73.0 | 74.0 | 73.5 | 70.1 | 66.9 |
| No. 2 | 65.0 | 64.0 | 72.5 | 71.5 | 71.5 | 65.0 | 73.0 | 73.0 | 69.4 | 65.6 |
| No. 3 | 73.0 | 56.0 | 69.0 | 67.0 | 68.5 | 71.0 | 54.5 | 71.5 | 66.3 | 66.3 |
| No. 4 | 66.5 | 64.5 | 63.5 | 63.5 | 60.5 | 60.0 | 65.5 | 65.5 | 63.7 | 64.4 |
| No. 5 | 72.5 | 72.0 | 71.5 | 71.5 | 70.5 | 69.5 | 68.0 | 61.5 | 6.96 | 66.3 |

In Table 4, the figures in each of columns "1", "2" "3", . . . "8" are input efficiency when only one of eight semiconductor laser devices, numbered 1 through 8, is turned on and driven. The figures in each of the columns are values when only the semiconductor laser that has the same number as the number in each of the columns is turned on. Further, the figures in column "Σ" are average values of input efficiency of the eight semiconductor laser devices. Further, the figures in column "ALL" are input efficiency when all of the eight semiconductor laser devices are turned on. As shown in Table 4, when all of the eight semiconductor laser devices are turned on, input efficiency is approximately 64% to 68%, and the input efficiency is very high.

It is not necessary that the semiconductor laser devices which are used in combination with the multiplexing optical system of the present invention are semiconductor laser devices, as described in the above embodiments, which are formed by arranging discrete single-cavity chips in an array. The semiconductor laser devices may be a single multi-cavity semiconductor laser device (LD bar), laser devices formed by arranging a plurality of multi-cavity semiconductor laser devices in an array, a combination of a single-cavity semiconductor laser device and a multi-cavity semiconductor laser device, or the like.

Further, although the number of laser beams to be combined in each of the aforementioned embodiment was eight, it is not necessary that the number of the laser beams is eight. Another number of laser beams may be combined using the optical fiber.

Further, it is not necessary that the shape of the anamorphic lens used as the second condensing lens in the present invention is the shape described above. An anamorphic lens that has a different shape may be appropriately adopted based on the arrangement of the plurality of semiconductor lasers or the like. For example, in the first embodiment, the multiplexing optical system of the present invention is applied to the structure in which four semiconductor devices are arranged in the fast axis direction and two semiconductor devices are arranged in the slow axis direction (eight semiconductor laser devices in total). However, when the semiconductor laser devices are arranged in an opposite manner, namely when two semiconductor devices are arranged in the fast axis direction and four semiconductor devices are arranged in the slow axis direction (eight semiconductor laser devices in total), an anamorphic lens that has a plane shape defined by the coefficients in Table 5 may be optionally used. In this case, the shape of the plane is determined in a manner similar to the method in the first embodiment. Further, it is presumed that the shape of a plane is defined by equation 1.

TABLE 5

| CX | $7.8667 \times 10^{-2}$ |
|---|---|
| CY | 0.0 |
| KX | $2.4746 \times 10^{-1}$ |
| KY | 0.0 |
| A4 | $-6.2776 \times 10^{-8}$ |
| K2 | 2.1886 |
| A6 | $5.0146 \times ^{-10}$ |
| K3 | $1.9434 \times 10^{-1}$ |
| A8 | $5.0677 \times 10^{-15}$ |
| K4 | $-1.5472$ |
| A10 | $2.8593 \times 10^{-20}$ |
| K5 | $7.3949 \times 10^{-3}$ |

What is claimed is:

1. A multiplexing optical system comprising:
a plurality of collimator lenses;
a first condensing lens;
a second condensing lens; and
an optical fiber, wherein the plurality of collimator lenses collimates each of divergent laser beams that have been emitted from a plurality of semiconductor lasers arranged so that the stripe width directions of the semiconductor lasers are parallel to each other, and wherein the first condensing lens is formed by a cylindrical lens for condensing laser beams transmitted through the collimator lenses in only one of a plane including the stripe width direction of the semiconductor lasers and a plane including a direction perpendicular to the stripe width direction, and wherein the second condensing lens is formed by an anamorphic lens for condensing laser beams transmitted through the first condensing lens in the two planes in cooperation with the first condensing lens, and wherein the shapes of the anamorphic lens in the two planes are different from each other, and wherein the optical fiber is arranged in such a manner that the surface of an incident end of the optical fiber is positioned at a convergence position of the plurality of laser beams transmitted through the second condensing lens.

2. A multiplexing optical system, as defined in claim 1, wherein the plurality of semiconductor lasers is arranged in a matrix form by arranging a plurality of semiconductor lasers in a direction parallel to the stripe width direction and by arranging a plurality of semiconductor lasers in the direction perpendicular to the stripe width direction, and wherein the number of the semiconductor lasers arranged next to each other in the direction perpendicular to the stripe width direction is larger than that of the semiconductor lasers arranged next to each other in the direction parallel to the stripe width direction.

3. A multiplexing optical system, as defined in claim 1, wherein an NA (numerical aperture) in the plane including the stripe width direction is less than an NA (numerical aperture) in the plane including the direction perpendicular to the stripe width direction.

4. A multiplexing optical system, as defined in claim 2, wherein an NA (numerical aperture) in the plane including the stripe width direction is less than an NA (numerical aperture) in the plane including the direction perpendicular to the stripe width direction.

5. A multiplexing optical system, as defined in claim 1, wherein the plurality of semiconductor lasers is fixed onto a block made of metal, and wherein the block is further fixed onto a heat radiation block.

6. A multiplexing optical system, as defined in claim 5, wherein the plurality of semiconductor lasers is fixed onto the block made of metal through a submount.

7. A multiplexing optical system, as defined in claim 6, wherein the submount is made of a steel-diamond composite material.

8. A multiplexing optical system, as defined in claim 5, wherein the block made of metal and the heat radiation block are made of Cu.

9. A multiplexing optical system, as defined in claim 6, wherein the block made of metal and the heat radiation block are made of Cu.

10. A multiplexing optical system, as defined in claim 7, wherein the block made of metal and the heat radiation block are made of Cu.

11. A multiplexing optical system, as defined in claim 1, wherein the plurality of collimator lenses is truncated lenses.

12. A multiplexing optical system, as defined in claim 1, wherein the plurality of semiconductor lasers and the plurality of collimator lenses are housed in a sealed container.

13. A multiplexing optical system, as defined in claim 1, wherein each of the plurality of semiconductor lasers is a GaN-based semiconductor laser.

* * * * *